Patented July 22, 1930

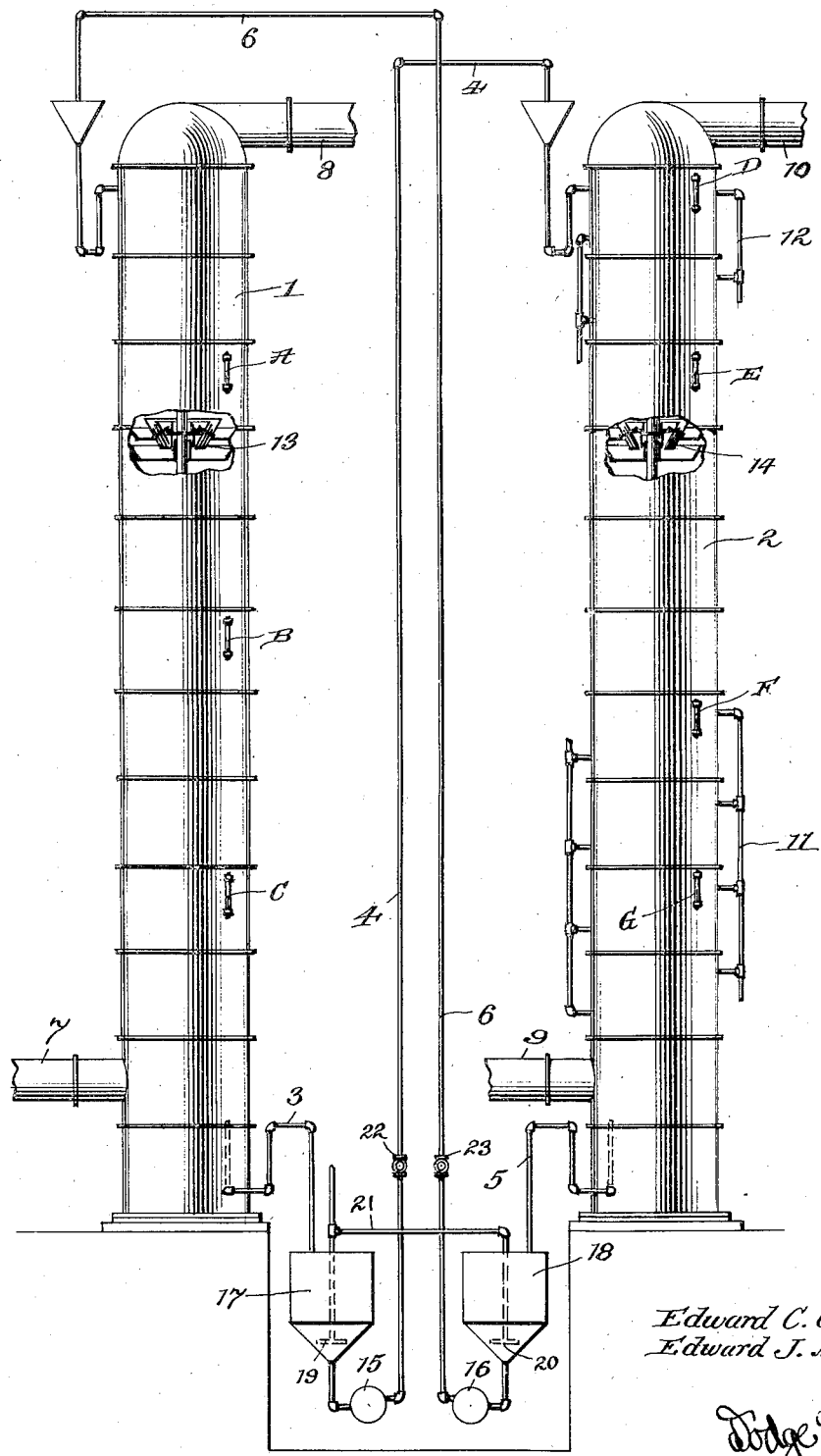

1,771,153

UNITED STATES PATENT OFFICE

EDWARD C. UHLIG AND EDWARD J. MURPHY, OF BROOKLYN, NEW YORK, ASSIGNORS TO THE BARTLETT HAYWARD COMPANY, OF BALTIMORE, MARYLAND, A CORPORATION OF MARYLAND

PROCESS OF PURIFYING GASES

Application filed December 6, 1923. Serial No. 678,973.

Our invention relates to the removal of impurities from gases. More specifically, it relates to a continuous process of purification employing as the purification medium, a solid suspended in a carrying vehicle.

In the purification of gases it has been customary to use what is known as "dry purifiers". For example iron oxide, iron salts, and salts of other metals have been mixed with saw dust to form a purification medium. Dry purification, while fairly efficient has many disadvantages. A continuous system of liquid purification in which gases are purified by contact with a liquid suspension and the latter continuously revivified, has many advantages thereover including the handling of large volumes of gas and cheaper operation.

We have found that by employing a solid such as metallic oxides, hydroxides, and salts, suspended in a carrying vehicle preferably water, an efficient continuous liquid purification of gases may be effected whereby the hydrogen sulfide-content of the gas is reduced to a minimum. We have found iron oxide very satisfactory, although manganese oxides and hydroxides can be used. Preferably, we use iron oxide which has been reduced to a fine state of division and heated to a degree sufficient to greatly increase its capacity for removal of impurities, the preparation of the oxide being set forth in a co-pending application, Serial No. 679,007, filed December 6, 1923, in the name of Edward J. Murphy. It is obvious, however, that our invention is not limited to the use of any specific solid medium, but in its broadest aspect contemplates the use of any suitable solid.

The purification of the gases and the revivification of the liquid suspension may be effected in any suitable apparatus such as columns, tanks, or towers but in the preferred form of our invention we contemplate the use of mechanical scrubbers, such as Feld washers which afford a large surface of contact, as the purifier and revivifier elements. The uses of mechanical scrubbers in our continuous purification process constitutes one of the features thereof as it is scarcely possible to operate economically when using towers and the like, in view of the necessity of maintaining a low concentration of solids in the liquid suspension. Additionally, the solid component of the liquid suspension, preferably iron oxide, reacts too slowly in apparatus of the non-mechanical type, such as towers, due to the poor contact. In the accompanying drawing we have shown, more or less diagrammatically, one form of apparatus suitable for carrying out our continuous process of purification and revivification.

The apparatus comprises a purifier 1 and a revivifier 2, operatively connected by means of conduits 3, 4, 5 and 6 to permit the liquid suspension to be continuously passed from the purifier 1 to the revivifier 2 and returned to the former. The purifier and revivifier elements may be built up, as shown, of a series of Feld washer sections having the customary cones 13 and 14 which are adapted to rotate at a speed which will produce a finely divided state of liquid suspension. At the bottom of purifier 1, a conduit 7 is provided for the admission of crude gas, and at the top, conduit 8 provides for the withdrawal of the cleaned gas. The revivifier 2 has conduits 9 and 10 connected therewith for the passage of the incoming and outgoing air. Certain sections of the revivifier 2 are provided with heating and cooling coils as shown at 11 and 12 respectively. By cooling the upper sections of the revivifier, the temperature of the outgoing air may be maintained below 90° F. thereby preventing water vapor loss due to the heated air. Pump 15 is provided for withdrawing the fouled liquid suspension from the fouled suspension tank 17 and passing it to revivifier 2. By means of pump 16 the revivified suspension is passed from the revivified suspension tank 18, through conduit 6 to purifier 1. Both the revivified and the fouled suspension tanks are provided with agitators 19 and 20 respectively to which air is fed by means of conduit 21. Thermometers A to G inclusive are provided in various sections of the purifier and revivifier to aid in the proper temperature-control. 22 and 23 are valves for controlling the rate of flow of the suspension.

The process may be carried out as follows: The crude gas is continuously introduced at 7 and passes through purifier 1 in a direction counter-current to the flow of the liquid suspension. The fouled suspension passes from purifier 1 through conduit 3, to fouled-suspension tank 17 when it is continuously agitated by means of the air agitator 19, and then through conduit 4 to revivifier 2 where it passes in a direction counter-current to the oxidizing agent which is preferably air. The revivified suspension passes from revivifier 2, through conduit 5 to the revivified-suspension tank 18, where it is subjected to an additional air agitation and then through conduit 6 to purifier 1.

Upon the specific gas to be purified and the type and concentration of the liquid suspension will depend the regulation of the speed of flow of the gas, and the liquid suspension, and the temperature of the purifier and revivifier. At lower temperatures the revivifying of the fouled suspensions proceeds slowly; as the temperature is increased the revivification is accelerated. It has been found that at 160° F. the revivification of the fouled suspension proceeds satisfactorily. While different operating conditions will, of course, require different rates of air flow through the revivifier, we find that in general the air flow should be sufficient to provide from 18 to 50 cubic feet of air per gallon of fouled suspension.

In a specific run, gas containing from 118 to 160 grains of hydrogen sulfide per 100 cubic feet, was passed through the purifier 1, 20 to 40 gallons of liquid suspension being used per 1,000 cubic feet of gas. The hydrogen sulfide content of the gas at the purifier washer outlet 8 varied from 20 to 50 grains per 100 cubic feet. In some of the tests 50 gallons of liquid suspension per 1,000 cubic feet of gas were provided.

Our experiments indicate that using the same number of gallons of liquid suspension per 1,000 cubic feet of gas, different results in hydrogen sulfide absorption are obtained, when different rates of gas flow are used. For example, when the gas is purified at the rate of 8 cubic feet per minute with an equivalent of 30 gallons of liquid suspension per 1,000 cubic feet, a better absorption is obtained than when the gas is purified at the rate of 16 cubic feet per minute and the same equivalent gallons of liquid suspension per 1,000 cubic feet. The above results clearly indicate that the time of contact will greatly influence the absorption efficiency of the liquid suspension and that the concentration of the liquid suspension is of less importance than the time of contact.

In preparing the liquid suspension we preferably utilize as the solid component, iron oxides which have been reduced to a very fine state of division and thereafter heated in order to increase their capacity to remove hydrogen sulfide. For example, we have found the Lake Superior ores very satisfactory. For the best results, it has been found that the oxide should be reduced to two hundred mesh and then heated preferably to between 200° C. and 400° C. Iron oxide which has been reduced to one hundred mesh and heated to 200° C. shows a fair removal capacity. However, at 300° C., this greatly increases and at 400° C., the capacity is still greater. Iron oxide which has been reduced to two hundred mesh and heated to between 300° C. and 400° C., shows a greater capacity for the removal of hydrogen sulfide than that which has been reduced to only one hundred mesh and subjected to the same heat treatment. The liquid suspension which we prefer to use consists of an ore treated as set forth, suspended in a carrying medium, such as water, the oxide being present in sufficient quantity to provide by weight, a 3% liquid suspension, although any other suspension which will readily flow may be used. For example, a suspension may be obtained by the suspension in 950 gallons of water of 250 pounds of iron oxide.

Instead of using natural occurring iron oxide, an artificial product may be prepared by reacting ferrous sulfate with lime and oxidizing the resulting ferrous hydroxide to ferric hydroxide by passing air through the precipitate suspended in water. This may also be done by mixing the powdered components dry and then moistening them with water and allowing the resulting ferrous hydroxide to oxidize to ferric hydroxide. The reaction between the ferrous sulfate and lime may be represented by the following equation:

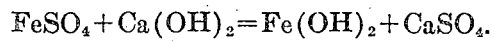

$$FeSO_4 + Ca(OH)_2 = Fe(OH)_2 + CaSO_4.$$

Proceeding according to the above, a product containing about 37% of ferric oxide is obtained. The remaining 63% is practically all calcium sulfate which is an inert and insoluble material. Magnesium oxide or hydroxide, calcium carbonate in the form of powdered limestone, marble, whiting, dolomite, and the like, may be used to replace the lime. When magnesium oxide or hydroxide is used there is an end product of magnesium sulfate. As this material is soluble in water, it will diminish the inert matter present in the suspension. Soda ash ($Na_2CO_3$) also combines with ferrous sulfate to form iron oxide and sodium sulfate, the latter being soluble in water. If it is desirable to partially or completely replace the lime, soda ash may be used and in this way the amount of inert matter present may be controlled. The partial replacement of the lime by soda ash and then adding more soda ash in very slight excess has certain advantages.

Using ferrous sulfate and lime the purification material may be made by adding 0.75 lb. of ferrous sulfate, and .25 lb. of lime to each gallon of water. Two-thirds of the water is used to dissolve the ferrous sulfate and the other third to make a thin milk of lime. It is important that a thin milk of lime be added to the ferrous sulfate solution as otherwise a thick, lumpy precipitate is formed which is difficult to oxidize to the ferric state. These materials form a dark green precipitate of ferrous hydroxide. Upon agitating the latter in suspension with air the ferrous hydrate becomes brownish red in color indicating its passage to the ferric state.

Our invention, as set forth, broadly contemplates a process of continuously purifying gases comprising passing the same through a purifier having present a liquid suspension containing a solid compound, passing the fouled suspension through a revivifier in intimate contact with an oxidizing agent and returning the revivified suspension to the purifier. More specifically our invention comprises a process having the following features:

(1) The use of mechanical scrubbers,
(2) The use of the counter-current principle in both the purifier and the revivifier,
(3) The use of a specially prepared iron oxide,
(4) The control of the purifier and revivifier temperature-conditions, and
(5) The control of the time of contact of the gas with the liquid suspension.

After repeated operations the revivified suspension fails to efficiently purify due to the accumulation of free sulphur. When the liquid suspension has reached this stage, it may be withdrawn from the system and the sulphur-content thereof recovered and utilized in the manufacture of sulphuric acid or other products where sulphur is used.

We claim:

1. The process of continuously purifying gases comprising passing the same through a mechanical purifier presenting a large surface of contact and having present a moving liquid suspension containing iron oxide, passing the fouled suspension together with an oxidizing agent through a mechanical revivifier presenting a large surface of contact, and returning the revivified suspension to the purifier.

2. The process of continuously purifying gases comprising passing the same through a mechanical purifier presenting a large surface of contact and having present a liquid suspension containing iron oxide moving in a direction counter-current to the gases, passing the fouled suspension through a mechanical revivifier presenting a large surface of contact in a direction counter-current to a moving oxidizing agent, and returning the revivified suspension to the purifier.

3. The process of continuously purifying gases comprising passing the same through a mechanical purifier presenting a large surface of contact and having present a liquid suspension containing iron oxide moving in a direction counter-current to the gasses, passing the fouled suspension through a mechanical revivifier containing a large surface of contact in a direction counter-current to a moving oxidizing agent, maintaining the temperature within the revivifier at approximately 160° F., and returning the revivified suspension to the purifier.

4. The process of continuously purifying gases comprising passing the same through a mechanical purifier presenting a large surface of contact and having present a liquid suspension containing iron oxide moving in a direction counter-current to the gases, passing the fouled suspension through a mechanical revivifier containing a large surface of contact in a direction counter-current to a moving oxidizing agent, supplied at the rate of 18 to 50 cubic feet per gallon of fouled suspension, and returning the revivified suspension to the purifier.

5. The process of continuously purifying gases comprising passing the same through a mechanical purifier presenting a large surface of contact and having present a liquid suspension containing iron oxide, moving in a direction counter-current to the gases, passing the fouled suspension through a mechanical revivifier containing a large surface of contact in a direction counter-current to a moving oxidizing agent, supplied at the rate of 18 to 50 cubic feet per gallon of fouled suspension, maintaining the temperature within the revivifier at approximately 160° F., and returning the revivified suspension to the purifier.

6. The process of continuously purifying gases comprising passing the same through a purifier having present a liquid suspension containing iron oxide which has been reduced to a fine state of division and heated to greatly increase its activity, passing the fouled suspension together with an oxidizing agent through a revivifier, and returning the revivified suspension to the purifier.

7. The process of continuously purifying gases comprising passing the same through a purifier having present a liquid suspension containing iron oxide which has been reduced to a fine state of division and heated to between 200° C. and 400° C., to greatly increase its activity, passing the fouled suspension together with an oxidizing agent through a revivifier, and returning the revivified suspension to the purifier.

8. The process of continuously purifying gases comprising passing the same through a purifier having present a liquid suspension containing iron oxide which has been reduced to two hundred mesh and heated to greatly increase its activity, passing the fouled suspension together with an oxidizing agent through a revivifier, and returning the revivified suspension to the purifier.

9. The process of continuously purifying gases comprising passing the same through a purifier having present a liquid suspension containing iron oxide which has been reduced to two hundred mesh and heated to between 200° C. and 400° C. to greatly increase its activity, passing the fouled suspension together with an oxidizing agent through a revivifier, and returning the revivified suspension to the purifier.

10. The process of continuously purifying gases comprising passing the same through a purifier having present a liquid suspension containing iron oxide which has been reduced to a fine state of division and heated to 400° C. to greatly increase its activity, passing the fouled suspension together with an oxidizing agent through a revivifier, and returning the revivified suspension to the purifier.

11. The process of continuously purifying gases comprising passing the same through a purifier having present a liquid suspension containing iron oxide, which has been reduced to a fine state of division and heated to a temperature greater than 200° C. to greatly increase its activity, passing the fouled suspension together with an oxidizing agent through a revivifier, and returning the revivified suspension to the purifier.

12. The process of continuously purifying gases comprising passing the same through a purifier having present a liquid suspension containing iron oxide which has been reduced to two hundred mesh and heated to 400° C. to greatly increase its activity, passing the fouled suspension together with an oxidizing agent through a revivifier, and returning the revivified suspension to the purifier.

13. The process of continuously purifying gases comprising passing the same through a mechanical scrubber presenting a large surface of contact and having present a liquid suspension containing iron oxide which has been reduced to a fine state of division and heated to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

14. The process of continuously purifying gases comprising passing the same through a mechanical scrubber presenting a large surface of contact and having present a liquid suspension containing iron oxide which has been reduced to two hundred mesh and heated to 400° C., to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

15. The process of continuously purifying gases comprising passing the same through a mechanical scrubber presenting a large surface of contact and having present a liquid suspension containing iron oxide which has been reduced to a fine state of division and heated to between 200° C. and 400° C., to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

16. The process of continuously purifying gases comprising passing the same through a mechanical scrubber presenting a large surface of contact and having present a liquid suspension containing iron oxide which has been reduced to two hundred mesh and heated to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

17. The process of continuously purifying gases comprising passing the same through a mechanical scrubber presenting a large surface of contact and having present a liquid suspension containing iron oxide which has been reduced to two hundred mesh and heated to 200° C. and 400° C. to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

18. The process of continuously purifying gases comprising passing the same through a mechanical scrubber presenting a large surface of contact and having present a liquid suspension containing iron oxide which has been reduced to a fine state of division and heated to 400° C. to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

19. The process of continuously purifying gases comprising passing the same through a mechanical scrubber presenting a large surface of contact and having present a liquid suspension containing iron oxide, which has been reduced to a fine state of division and heated to a temperature greater than 200° C. to greatly increase its activity, the suspension moving in a direction counter-current to the gases, passing the fouled suspension through a mechanical revivifier presenting a large surface of contact in a direction counter-current to a moving oxidizing agent and returning the revivified suspension to the purifier.

20. The process of purifying gases comprising passing the same through a liquid suspension containing iron oxide which has been reduced to a fine state of division and heated to greatly increase its activity.

21. The process of purifying gases comprising passing the same through a liquid suspension containing iron oxide which has been reduced to two hundred mesh and heated to 400° C. to greatly increase its activity.

22. The process of purifying gases comprising passing the same through a liquid suspension containing iron oxide which has been reduced to a fine state of division and heated to between 200° C. and 400° C. to greatly increase its activity.

23. The process of purifying gases comprising passing the same through a liquid suspension containing iron oxide which has been reduced to two hundred mesh and heated to greatly increase its activity.

24. The process of purifying gases comprising passing the same through a liquid suspension containing iron oxide which has been reduced to two hundred mesh and heated to between 200° C. and 400° C. to greatly increase its activity.

25. The process of purifying gases comprising passing the same through a liquid suspension containing iron oxide, which has been reduced to a fine state of division and heated to 400° C. to greatly increase its activity.

26. The process of purifying gases comprising passing the same through a liquid suspension containing iron oxide which has been reduced to a fine state of division and heated to a temperature greater than 200° C. to greatly increase its activity.

In testimony whereof we have signed our names to this specification.

EDWARD C. UHLIG.
EDWARD J. MURPHY.